(12) United States Patent
Klein et al.

(10) Patent No.: US 7,508,948 B2
(45) Date of Patent: Mar. 24, 2009

(54) REVERBERATION REMOVAL

(75) Inventors: David Justin Klein, Los Altos, CA (US); Lloyd Watts, Mountain View, CA (US)

(73) Assignee: Audience, Inc., Mountain View, CA (US)

( * ) Notice: Subject to any disclaimer, the term of this patent is extended or adjusted under 35 U.S.C. 154(b) by 920 days.

(21) Appl. No.: 10/959,408

(22) Filed: Oct. 5, 2004

(65) Prior Publication Data

US 2006/0072766 A1    Apr. 6, 2006

(51) Int. Cl.
   *H04B 3/00* (2006.01)
(52) U.S. Cl. .................. 381/66; 381/94.1; 381/94.2; 379/406.01; 379/406.12; 379/406.13
(58) Field of Classification Search .................. 381/66, 381/94.1–94.3, 94.7; 379/406.01–406.09, 379/406.1, 406.11–406.16
See application file for complete search history.

(56) References Cited

U.S. PATENT DOCUMENTS

| | | | |
|---|---|---|---|
| 3,662,108 A * | 5/1972 | Flanagan | 704/228 |
| 4,066,842 A | 1/1978 | Allen | |
| 4,341,964 A | 7/1982 | Chi et al. | |
| 4,426,729 A * | 1/1984 | Gritton | 704/231 |
| 6,718,041 B2 * | 4/2004 | Debail | 381/66 |
| 6,724,899 B1 * | 4/2004 | Taeger et al. | 381/83 |
| 6,725,027 B1 | 4/2004 | Tsuji et al. | |
| 7,317,800 B1 * | 1/2008 | Vierthaler et al. | 381/61 |
| 2003/0095667 A1 | 5/2003 | Watts | |

OTHER PUBLICATIONS

Kleinschmidt, M. "Robust Speech Recognition Based on Spectro-temporal Processing", Oldenburg, Univ., Diss, 2002.
Carl von Ossietzky, "Robust Speech Recognition based on Spetro-Temporal Features", Oldenburg, Univ., Apr. 2004.

* cited by examiner

*Primary Examiner*—Xu Mei
*Assistant Examiner*—Disler Paul
(74) *Attorney, Agent, or Firm*—Carr & Ferrell LLP

(57) ABSTRACT

A method of removing reverberation from audio signals is disclosed. The method comprises spectro-temporally analyzing the first audio signal and the second audio signal to derive an energy function of time for a plurality of frequency bands. The method further comprises determining a delay stability between the energy function of time for the first audio signal and the second audio signal in each band, determining a gain function in each band based on the delay stability, adjusting the energy of the first audio signal and the second audio signal using the gain function within each band, and resynthesizing audio signals from the energy in each band of the first audio signal and the second audio signal.

16 Claims, 15 Drawing Sheets

REVERBERATION REMOVAL

FIELD OF THE INVENTION

The present invention relates generally to audio signal processing. More specifically, reverberation removal is disclosed.

BACKGROUND OF THE INVENTION

In many situations audio signals are undesirably distorted by reverberations. For example, when a speakerphone is used, the microphone of the speakerphone tends to pick up voices that have been distorted by room reverberations and this can interfere with the ability to comprehend what is being said by the participants of the phone call. In this situation and in others where reverberation is an issue, it would be useful if reverberations could be effectively removed by signal processing.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Reverberation removal by signal processing audio signals is disclosed. In various embodiments, the signal processing may involve calculating the energy of the audio signals in different frequency bands, filtering the energy over time in each band such that reverberant energy is reduced, identifying the reverberation portion of the signals in each of the bands, establishing a gain function to remove the reverberant portion of the signal in each band, modifying the energy of the audio signals in each band using the gain function, resynthesizing the audio signals from the modified energy signals in each band, combining the processed signals into a single signal, and mixing the processed signals with other signals that mask undesirable processing artifacts.

Figure 1:
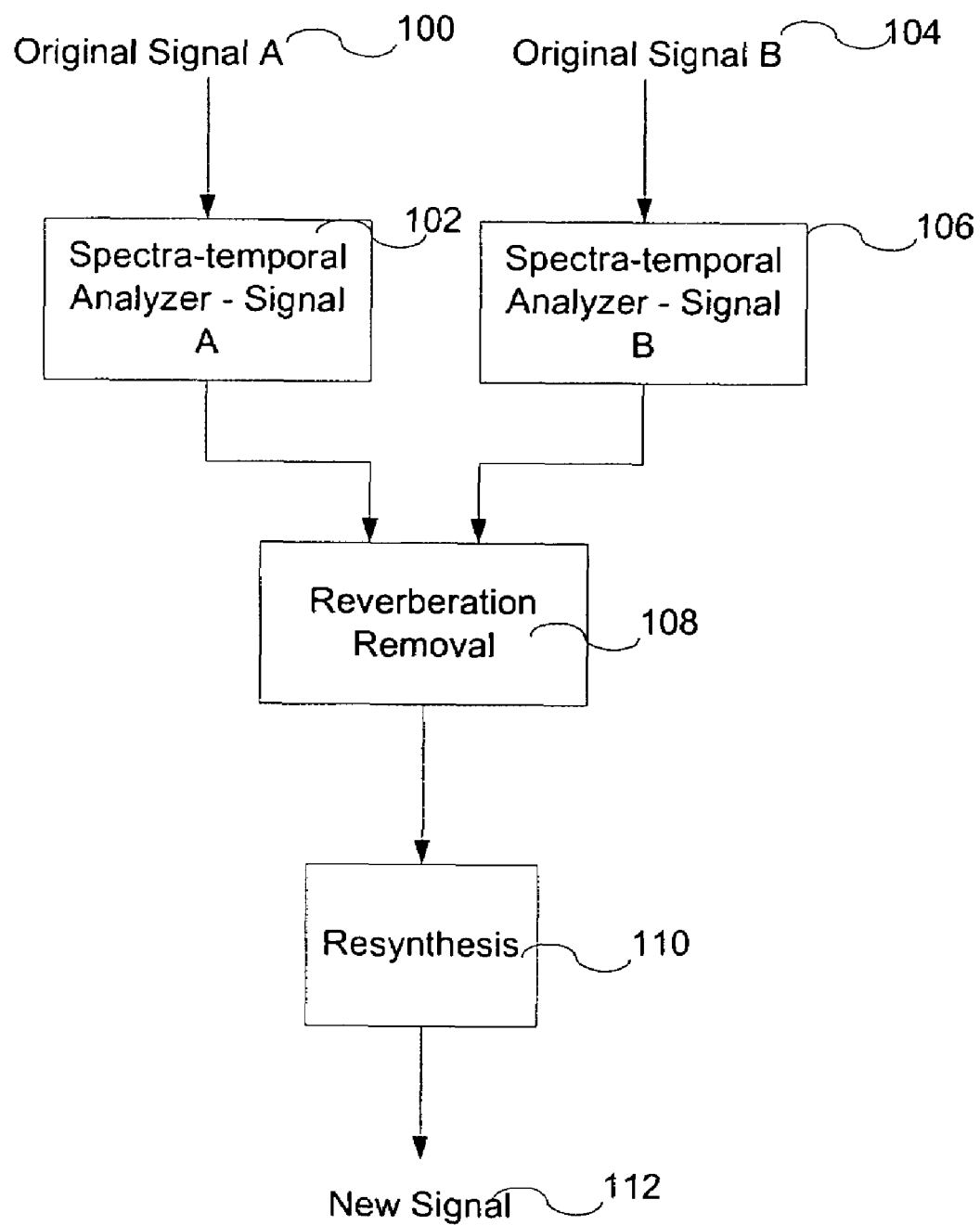
FIG. 1 illustrates signal processing for reverberation removal.

FIG. 1 illustrates signal processing for reverberation removal. Original signal A 100 and original signal B 104 are audio signals that are to be processed. In some embodiments, there is only one original signal. In some embodiments, there are two or more original signals. In some embodiments, the audio signals are microphone signals that both are in a space or room together. In some embodiments, the audio signals are recordings of microphone signals that both are in a space or room together. In some embodiments, the audio signals are analog. In some embodiments, the audio signals are digital. In some embodiments, the audio signals are a mixture of digital and analog. Original signal A 100 is first processed by spectro-temporal analyzer 102, original signal B 104 is first processed by spectro-temporal analyzer 106. The spectro-temporal analyzer produces signal outputs that indicate the amount of energy in the input signal within frequency bands over time. The spectro-temporal analyzer may be implemented in a number of different ways, including Fourier Transform, Fast Fourier Transform, Gammatone filter banks, wavelet transform, or cochlear models. Particularly useful implementations are the cochlear models described in U.S. patent application Ser. No. 09/534,682 by Lloyd Watts filed Mar. 24, 2000 entitled: "EFFICIENT COMPUTATION OF LOG-FREQUENCY-SCALE DIGITAL FILTER CASCADE" and U.S. patent application Ser. No. 10/074,991 by Lloyd Watts filed Feb. 13, 2002 entitled: "FILTER SET FOR FREQUENCY ANALYSIS" which are herein incorporated by reference for all purposes. In 108, reverberation is removed by analyzing the amount of energy within frequency bands in the input signals in order to identify the main part of the signals and reverberant part of the signals and then to suppress the reverberant part of the signals. In some embodiments, the reverberant part of the signal is identified using delay stability between two or more signals. In some embodiments, the reverberant part of the signal is identified using one or more signals known to contain mostly or only reverberant energy. In some embodiments, the reverberant part of the signal is identified by using a known reverberant impulse response function. Using this impulse response function the input signals can be processed to suppress the reverberant part of the signal. In some embodiments, the reverberant part of the signal is deduced from a voice pitch contour derived from the frequency bands with less reverberation and these are then used to suppress the more reverberant part of the signal. In 110, the temporal audio signal is resynthesized from the separate frequency band signals to create new signal 112 with the reverberant energy significantly suppressed. The resynthesis can be implemented in a number of different ways including inverse Fourier Transform, inverse Fast Fourier Transform, inverse wavelets, or algorithms that reproduce an acoustical waveform from a cochlea model output [described in U.S. Provisional Patent Application No. 60/608,812 filed Sep. 9, 2004 entitled: "SPARSE REPRESENTATION" which is herein incorporated by reference for all purposes.]. In some embodiments, both signal A and signal B are processed to remove the reverberant portion of the signal. In other embodiments, only one signal is used to remove the reverberant portion of the signal. In other embodiments, more than two signals are used to identify the reverberant portion of the signal. In some embodiments, more than two signals are processed to remove the reverberant portion of the signal.

Figure 2:
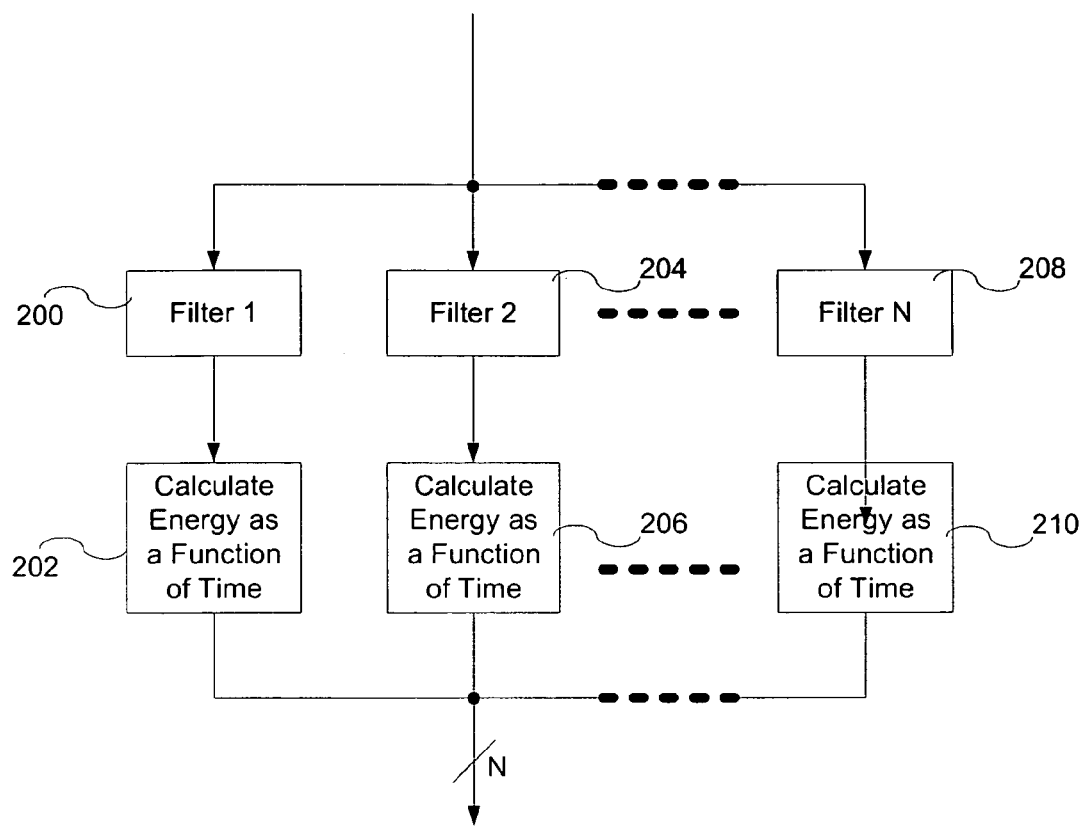
FIG. 2 illustrates a type of spectro-temporal analysis.

FIG. 2 illustrates a type of spectro-temporal analysis. In 200, 204, and 208, the input signal is bandpass filtered. In 202, 206, and 210, the energy in each band is then calculated.

Figure 3:
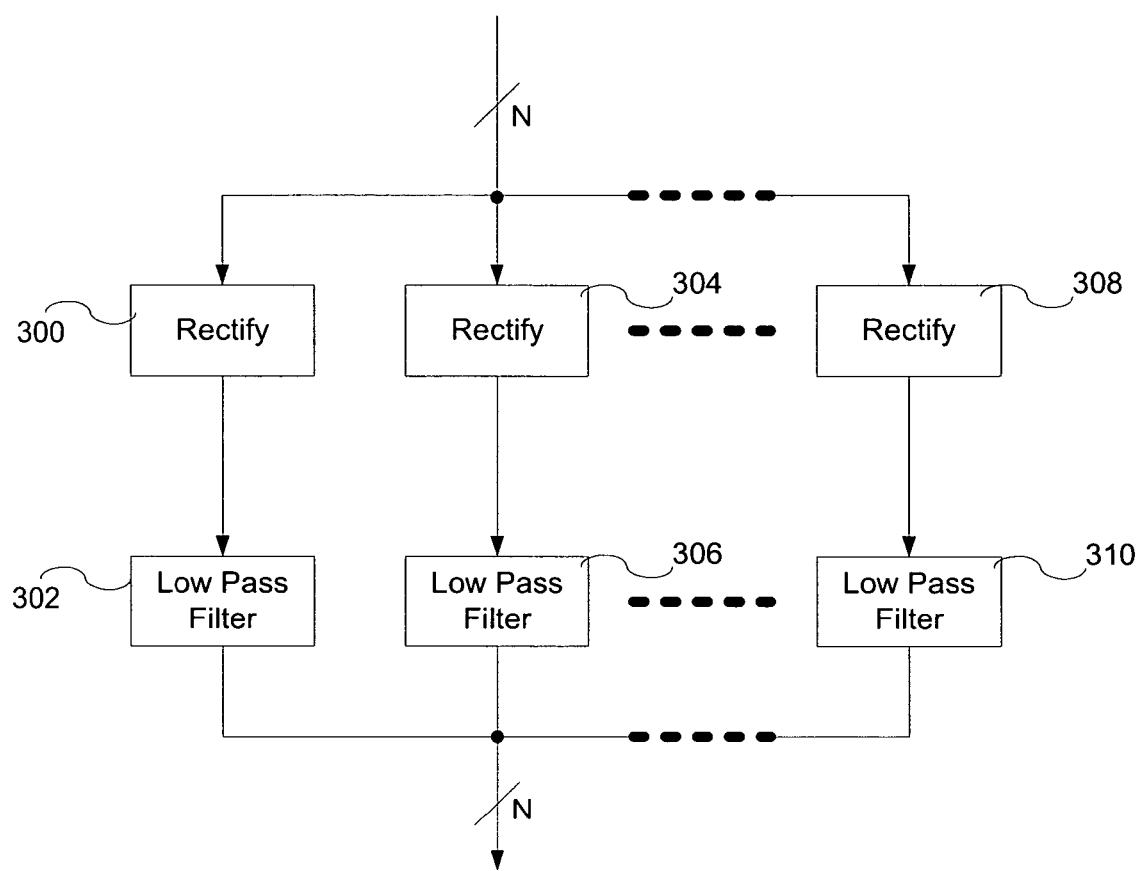
FIG. 3 illustrates a calculation of the energy in bands as a function of time.

FIG. 3 illustrates a calculation of the energy in bands as a function of time. In 300, 304, and 308, the input signal in each band is rectified. In 302, 306, and 310, the signal from each rectifier is low pass filtered to give the energy in each band.

Figure 4:
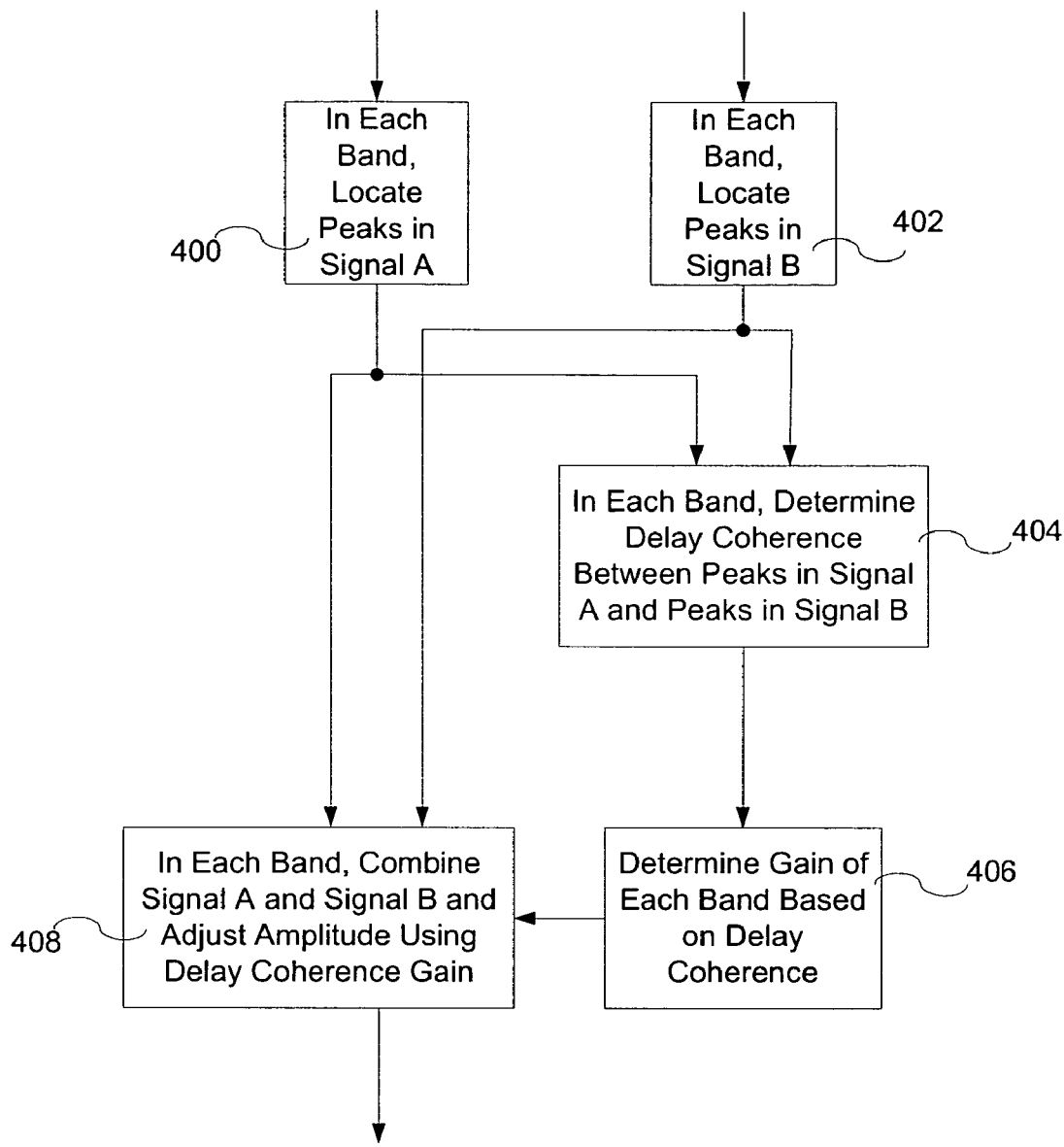
FIG. 4 illustrates reverberation removal process using delay stability to identify reverberant part of signal within a band.

FIG. 4 illustrates reverberation removal process using delay stability to identify reverberant part of signal within a band. In step 400 and 402, within each band the peaks in the energy are located. In step 404, within each band the delay stability between the peaks in signal A and peaks in signal B are determined. Peak determination can be implemented in a number of ways. If the signals are digital, peaks can be found by searching for samples that have higher values than the previous sample and the next sample. If the signals are analog, peaks can be found by detecting when the derivative of the signal changes sign from positive to negative (positive zero-crossing detector). In step 406, the gain for each band is determined based on the delay stability. When the delay between the peaks in the two channels is consistent over a period of time, or stable, then the gain for the band is generally set to be high. When the delay between the peaks in the two channels is not consistent over a period of time, or is not stable, then the gain for the band is generally set to be low. In some embodiments, the delays between more than two signals are used to determine the delay stability. In various embodiments, the gain is adjusted based on the measured stability using an appropriately selected function. In some embodiments, the gain is proportional to the delay stability. In other embodiments, the gain is a nonlinear function of the delay stability. In one embodiment, the stability is determined by multiplying each delay by the characteristic frequency of the band, computing the absolute value of the difference between consecutive delays, averaging this quantity over a period of time, adding 1 to this quantity dividing 1 by the result. In step 408, the two signals in a band are combined and the energy of the combined signals is adjusted using the gain based on the delay stability. In some embodiments, the signals are combined by selecting the larger of the two signals. In some embodiments, the signals are combined by selecting the average of the two signals. In some embodiments, the signals are both processed to remove the reverberant portion of the signals. In some embodiments, derived gain function is applied to the combination of more than two signals.

Figure 5:
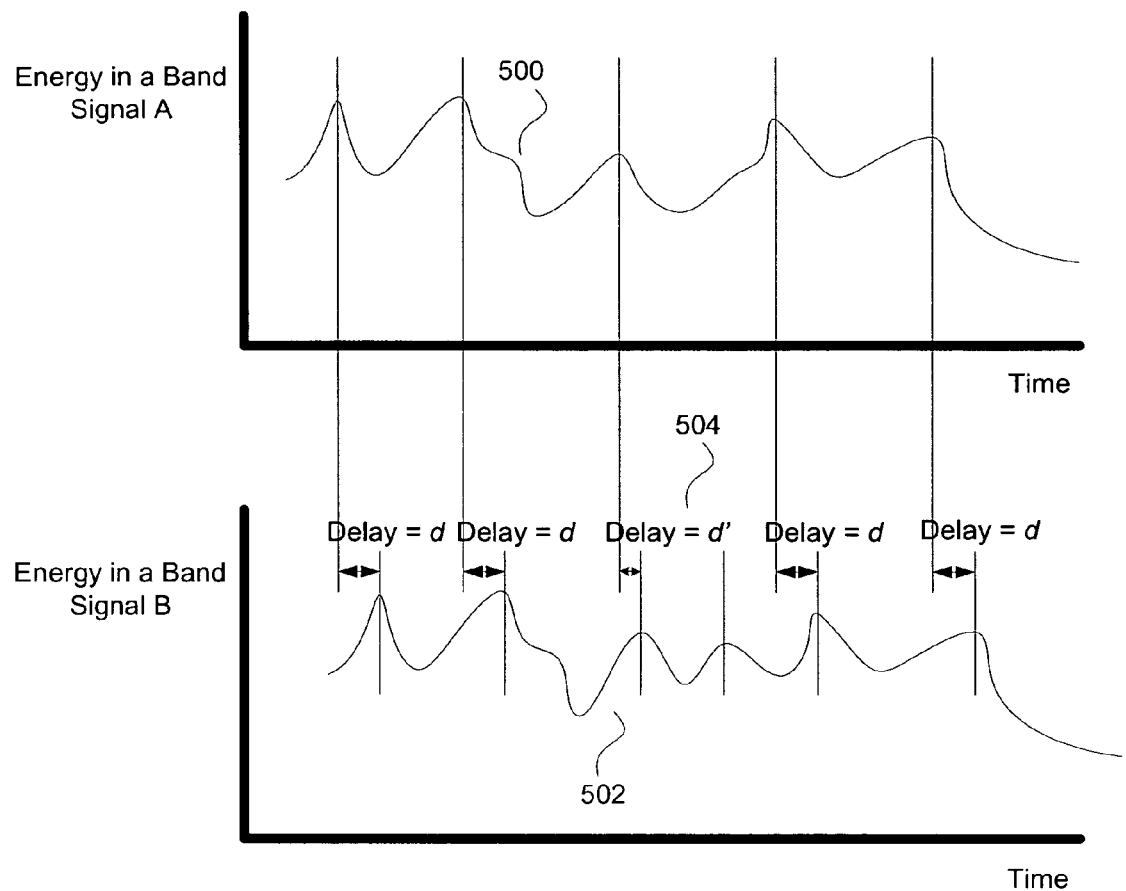
FIG. 5 illustrates peak finding and delay determination.

FIG. 5 illustrates peak finding and delay determination. Graph trace 500 shows the energy as a function of time for a band of signal A. Graph trace 502 shows the energy as a function of time for the same band of signal B. The delay between peaks is also shown. The delays between the peaks in signal A and the peaks in signal B are mostly the same (delay=d), and so they are mostly consistent. In region 504 of the trace, the delay is not the same (delay=d') and there is also a peak in the band of signal B that does not appear in signal A, and so the delays are mostly inconsistent. In region 504, the delay is considered not to be stable.

Figure 6:
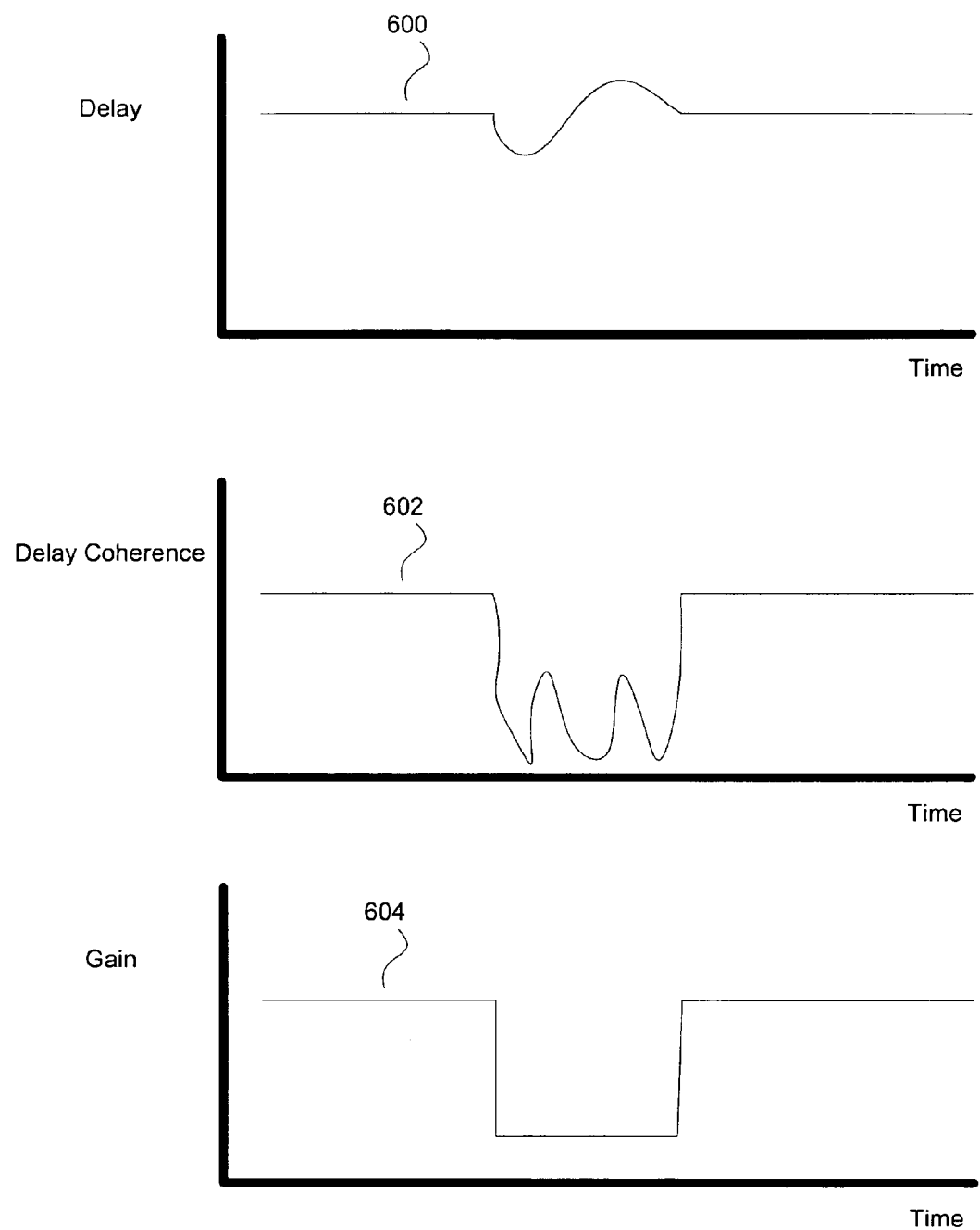
FIG. 6 illustrates the delay, delay stability, and the gain corresponding to FIG. 5.

FIG. 6 illustrates the delay, delay stability, and the gain corresponding to FIG. 5. Trace 600 illustrates the delay between the peaks in signal A and the peaks in signal B. Trace 602 illustrates the delay stability, or the degree to which the delay stays constant. The delay stability is a function of the delay whose value drops when the average slope of the delay is anything but horizontal. Trace 604 illustrates the gain based on the delay stability. When the delay stability drops, the gain is generally reduced.

Figure 7:
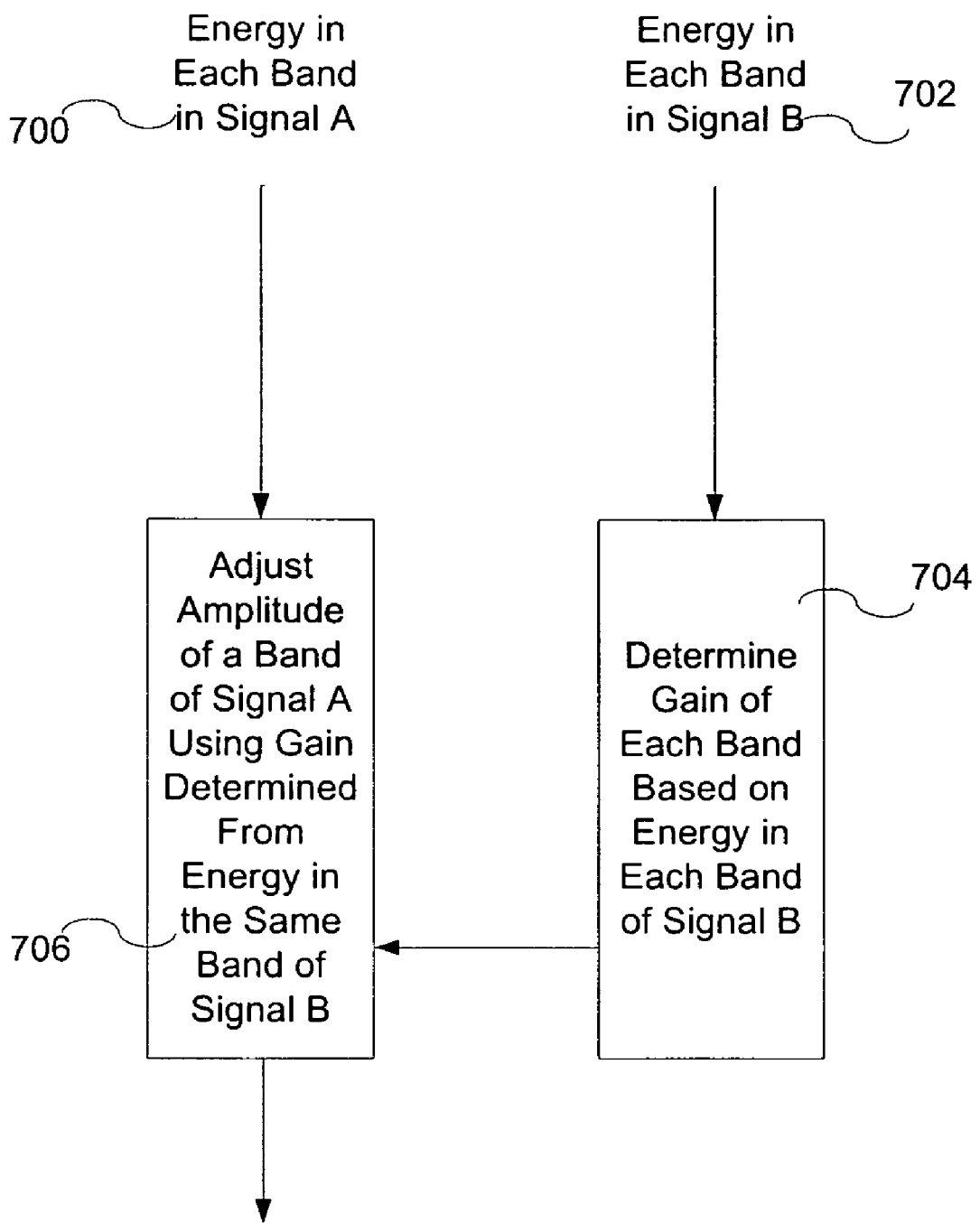
FIG. 7 illustrates reverberation removal process using a channel with the known characteristic that the channel contains mostly or entirely all of the reverberant part of the signal.

FIG. 7 illustrates reverberation removal process using a channel with the known characteristic that the channel contains mostly or entirely all of the reverberant part of the signal. In step 704, the gain in each band is determined using the signal energy in a given band from the channel (e.g. signal B as shown) with the known characteristic that the channel contains mostly, or entirely all of the reverberant part of the signal. In some embodiments, the gain is determined by taking the ratio of the energy from signal B to signal A, adding this ratio to 1, and dividing 1 by the result. In other embodiments, the gain is at one constant value except when the energy in signal rises above a threshold at which point the gain is at a lower constant value to suppress the reverberation energy. In step 706, the gain is used from step 704 to adjust the energy for each band of signal A.

Figure 8:
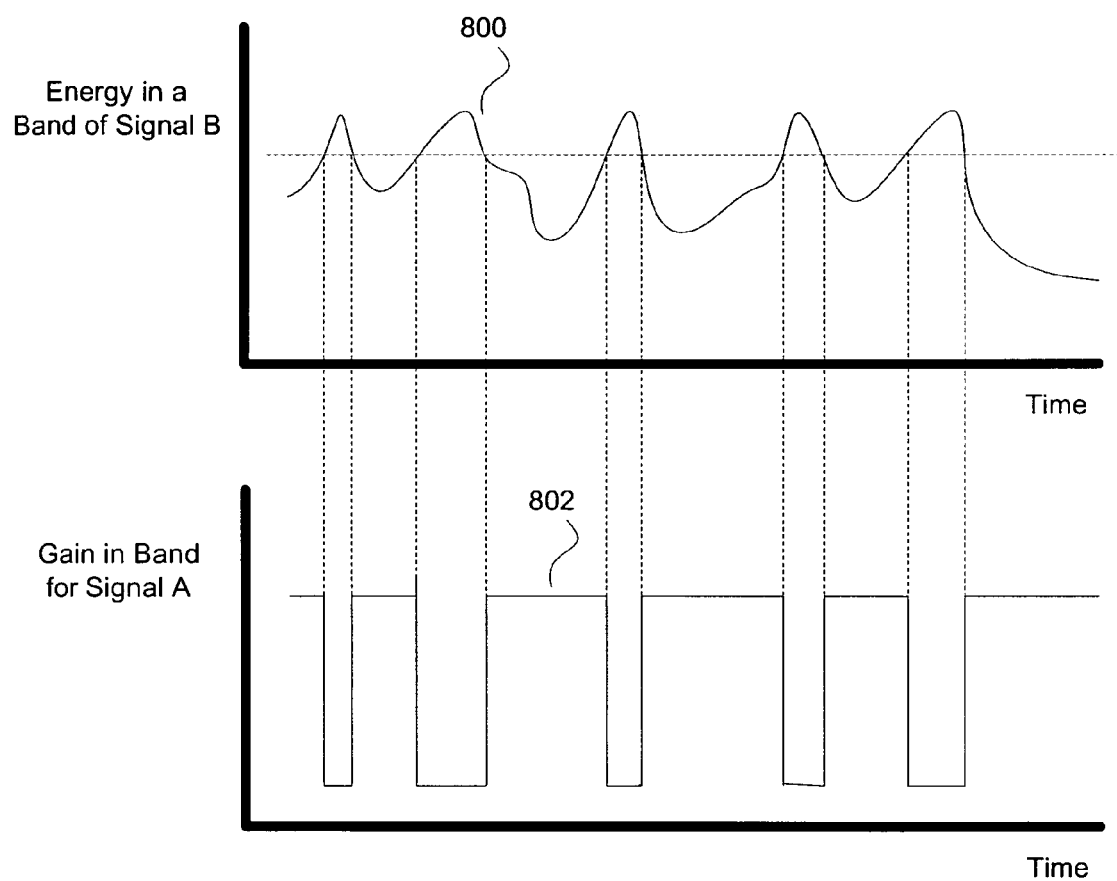
FIG. 8 illustrates a gain derived non-linearly from energy in a channel with the known characteristic that the channel contains mostly or entirely all of the reverberant part of the signal.

FIG. 8 illustrates a gain derived non-linearly from energy in a channel with the known characteristic that the channel contains mostly or entirely all of the reverberant part of the signal. Trace 800 is the energy in the channel. Trace 802 shows a gain that is at a constant level when trace 800 is above a threshold and at a lower constant value when trace 800 is below a threshold.

Figure 9:
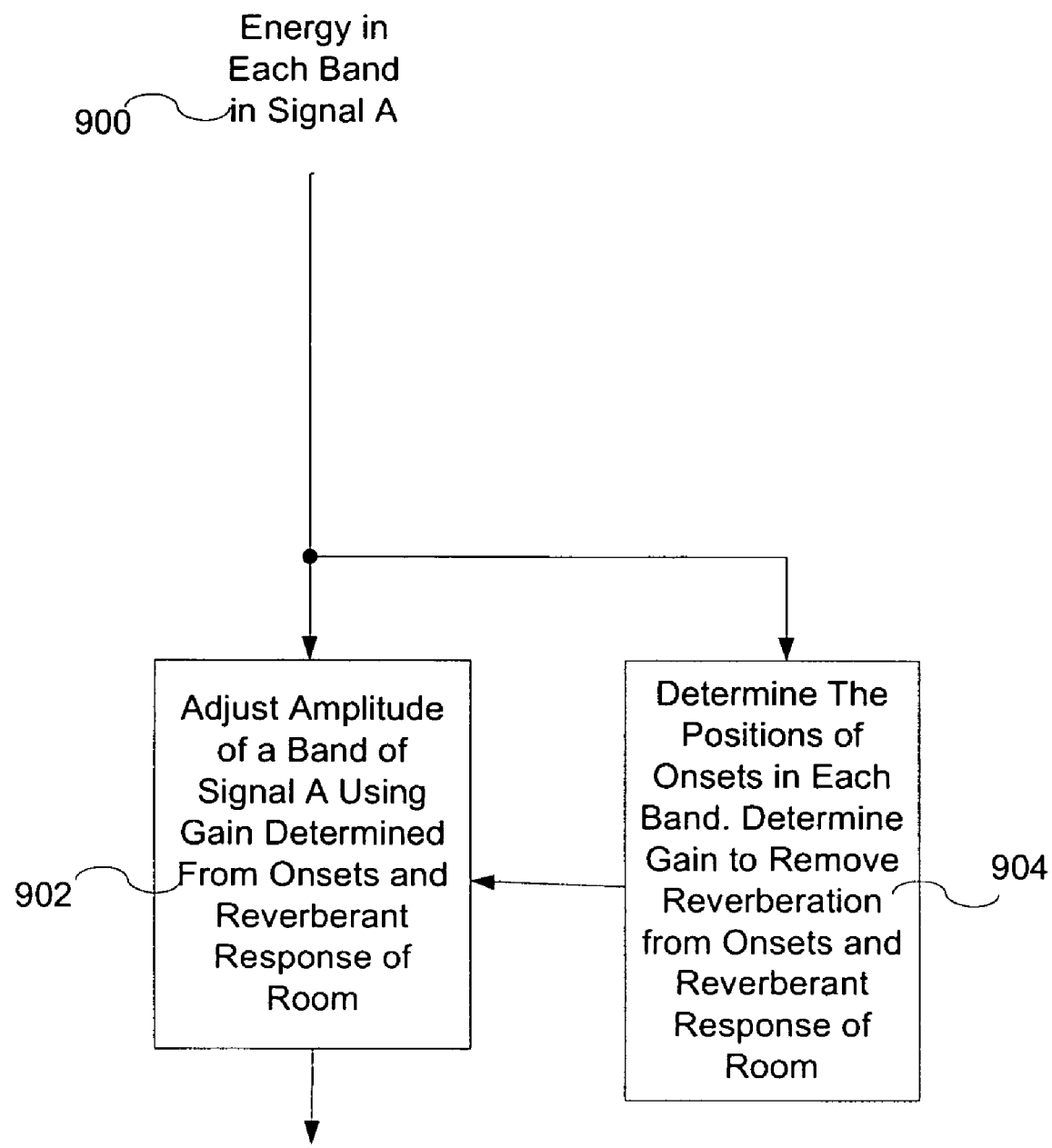
FIG. 9 illustrates reverberation removal using a known non-reverberant impulse response function and a reverberant impulse response function to remove the non-reverberant portion of the signal.

FIG. 9 illustrates reverberation removal using a known reverberant impulse response function to suppress the reverberant portion of the signal. In step 904, the energy of each signal band is processed to determine the positions of onsets. Reverberation reduction is achieved by knowing the positions of the onsets in the signal bands and knowing the reverberant response of the room to energy onsets in each frequency band. In some embodiments, the positions of energy onsets can be detected by measuring when the rate of change of the energy exceeds a fixed threshold. In some embodiments, the reverberant impulse response function is measured by examining the impulse response in a frequency band that has reverberation. In some embodiments, the signals in each band can be identified easily as a series of impulses, so that the reverberant portion of the impulse can be easily removed using a gain function. In some embodiments, an inverse filtering using the reverberant portion of the impulse function is implemented.

Figure 9A:
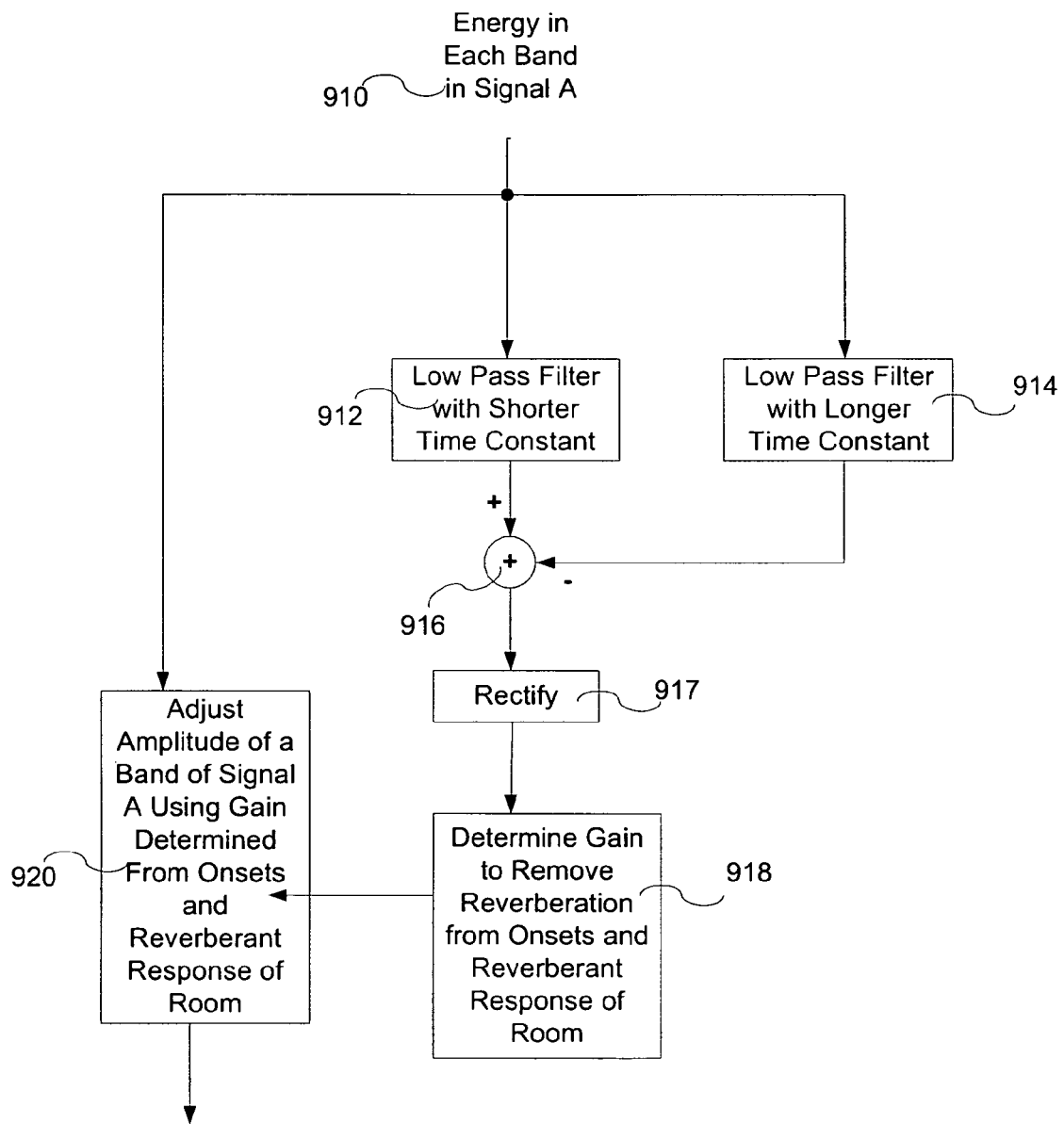
FIG. 9A illustrates an embodiment of reverberation removal using onset location and a known reverberant impulse function.
Figure 9B:
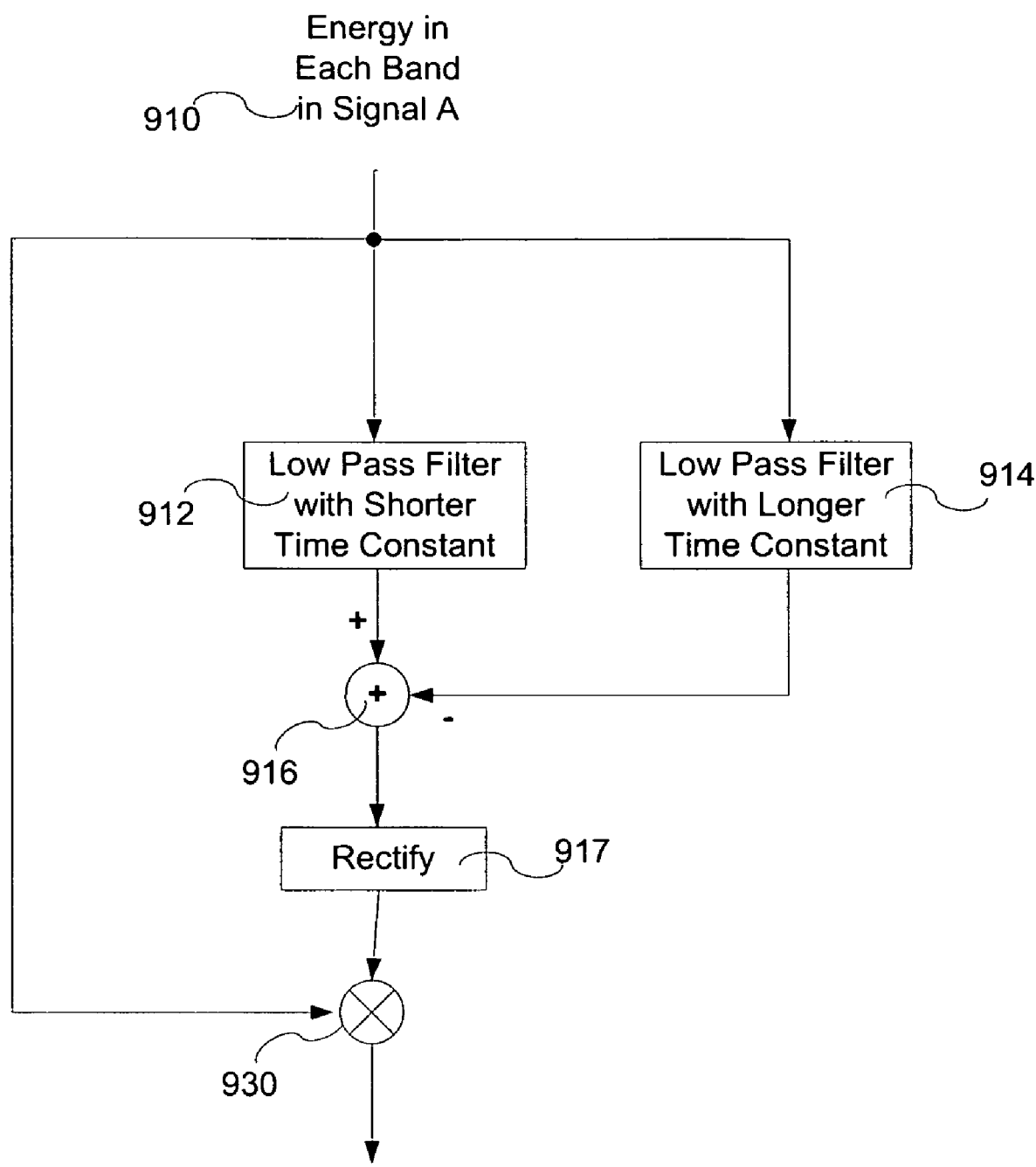
FIG. 9B illustrates an embodiment of reverberation removal using onset location and a known reverberant impulse function.

FIGS. 9A and 9B illustrate embodiments of reverberation removal using onset location and a known reverberant impulse function. In some embodiments, in order to extract onsets, a filter is applied to the energy output of each frequency. The filter is actually composed of two causal first-order low-pass filters, filter 912 with a shorter time constant (faster) and filter 914 with a longer time constant (slower). These time constants may be dependent on the frequency band. The time constants may be trained ahead of time or may be adapted on-line. Both filters are applied to the energy output function of time for each band 910, and then the output of the slower filter is subtracted (see 916) from the output of the faster filter, and the result is half-wave rectified (see 917). In some embodiments, the energy output might be first compressed (e.g., through a logarithm or square-root function) before being filtered. If so, the inverse function is applied after filtering. In 918, by applying a peak-finding algorithm to the final result, the position of onsets can be estimated (and in 920 used in an algorithm that uses a gain function to suppress energy after onsets). If instead the result is now mixed (see 930 in FIG. 9B) with the original signal and then resynthesized, onsets will be emphasized and processing artifacts will be less audible, depending on the mixture. The higher the proportion of original signal in the mixture, the less audible will be processing artifacts, but also the more audible will be the reverberation. In some embodiments, after the signal is subtracted (see 916) from the output of the faster filter, and the result is half-wave rectified (see 917), the signal is resynthesized and then mixed with the original signal.

Figure 10:
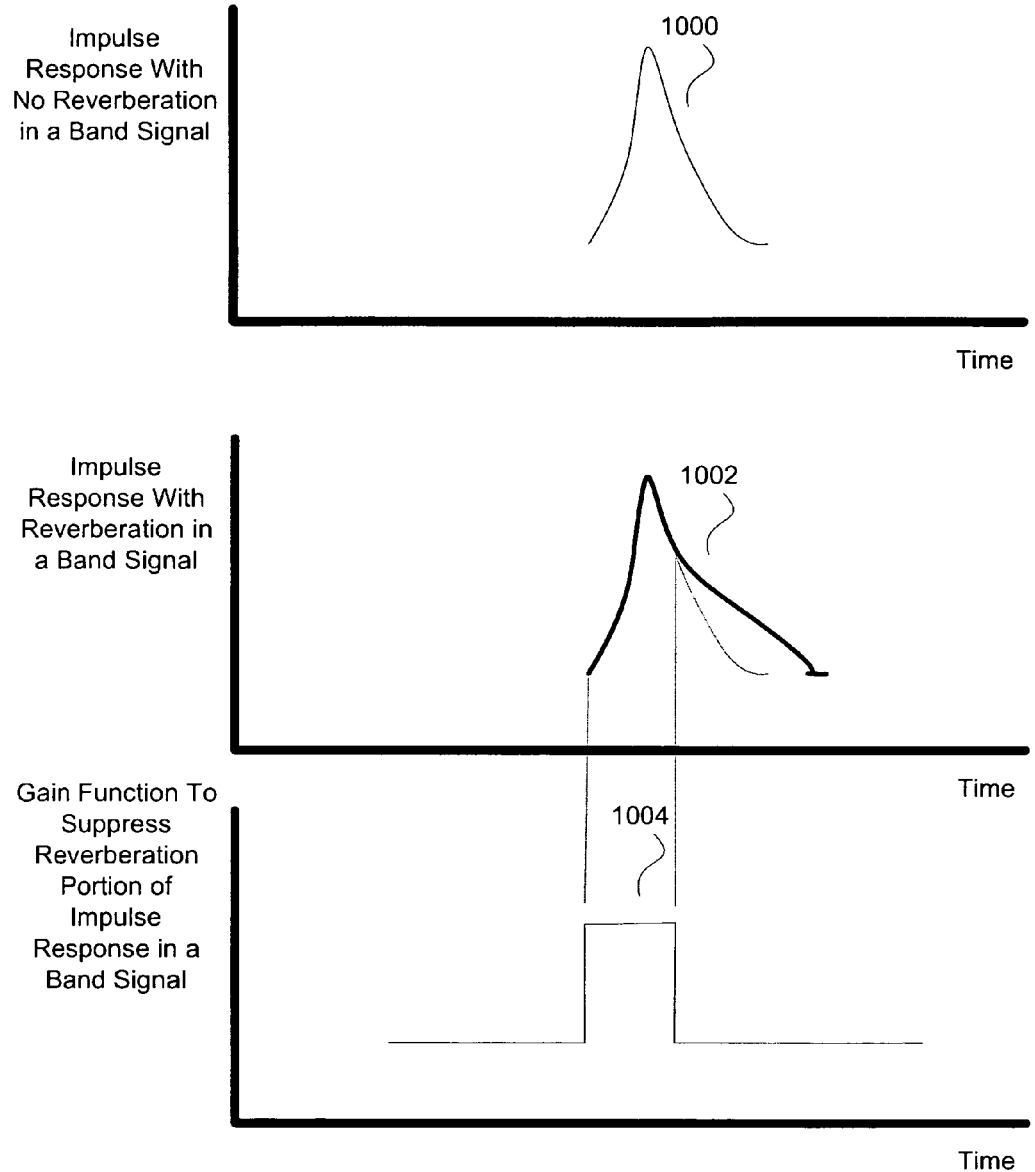
FIG. 10 illustrates a gain function derived from the non-reverberant and reverberant impulse response functions.

FIG. 10 illustrates a gain function derived from the reverberant impulse response functions. Trace 1000 illustrates the non-reverberant impulse. Trace 1002 illustrates the reverberant impulse response function overlaid on the non-reverberant impulse so that the differing portion of the non-reverberant part of the impulse response can be easily identified. Trace 1004 illustrates a gain function derived from the reverberant and non-reverberant impulse response functions designed to suppress reverberant energy.

Figure 11:
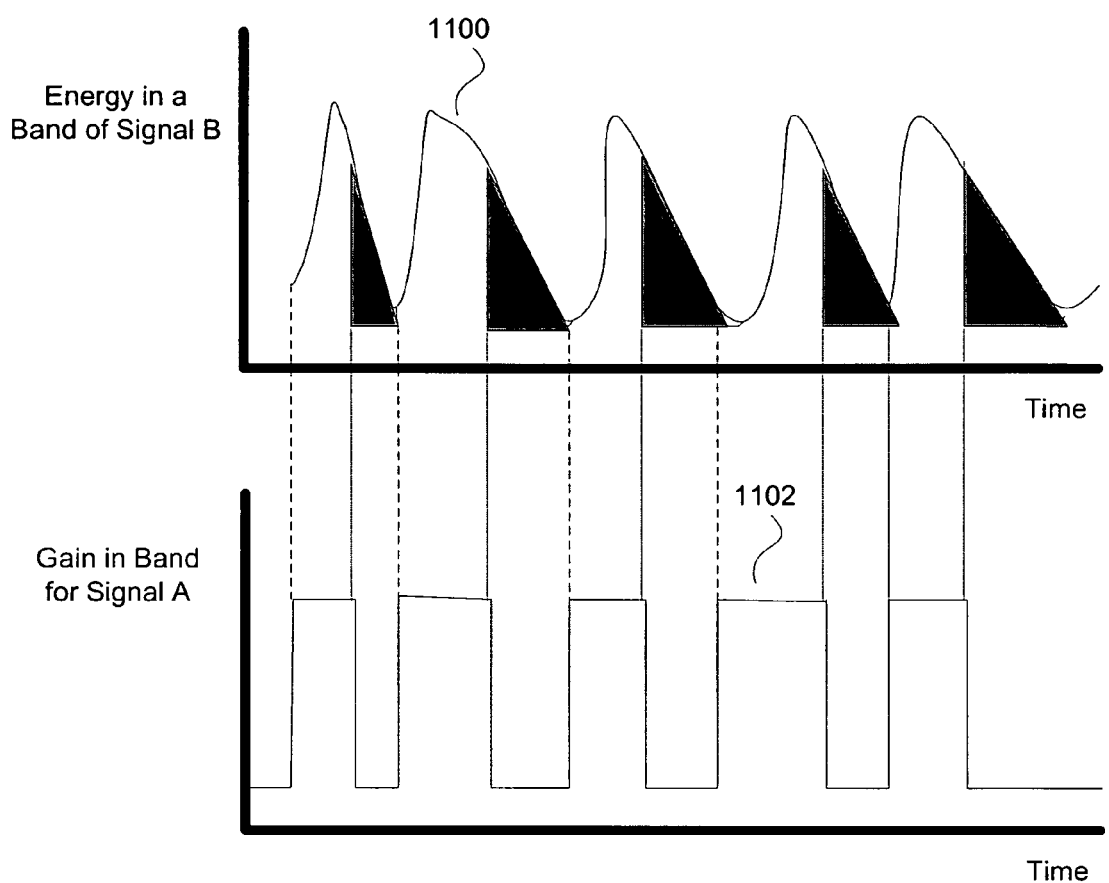
FIG. 11 illustrates a gain derived from knowing the non-reverberant impulse response function and the reverberant impulse response function.

FIG. 11 illustrates a gain derived from knowing the non-reverberant impulse and the reverberant impulse response function. Trace 1100 illustrates the energy in a band of the signal. The shaded portion of the trace represents the reverberant portion of the signal. Trace 1102 illustrates a gain function derived to suppress the reverberant portion of the signal.

Figure 12:
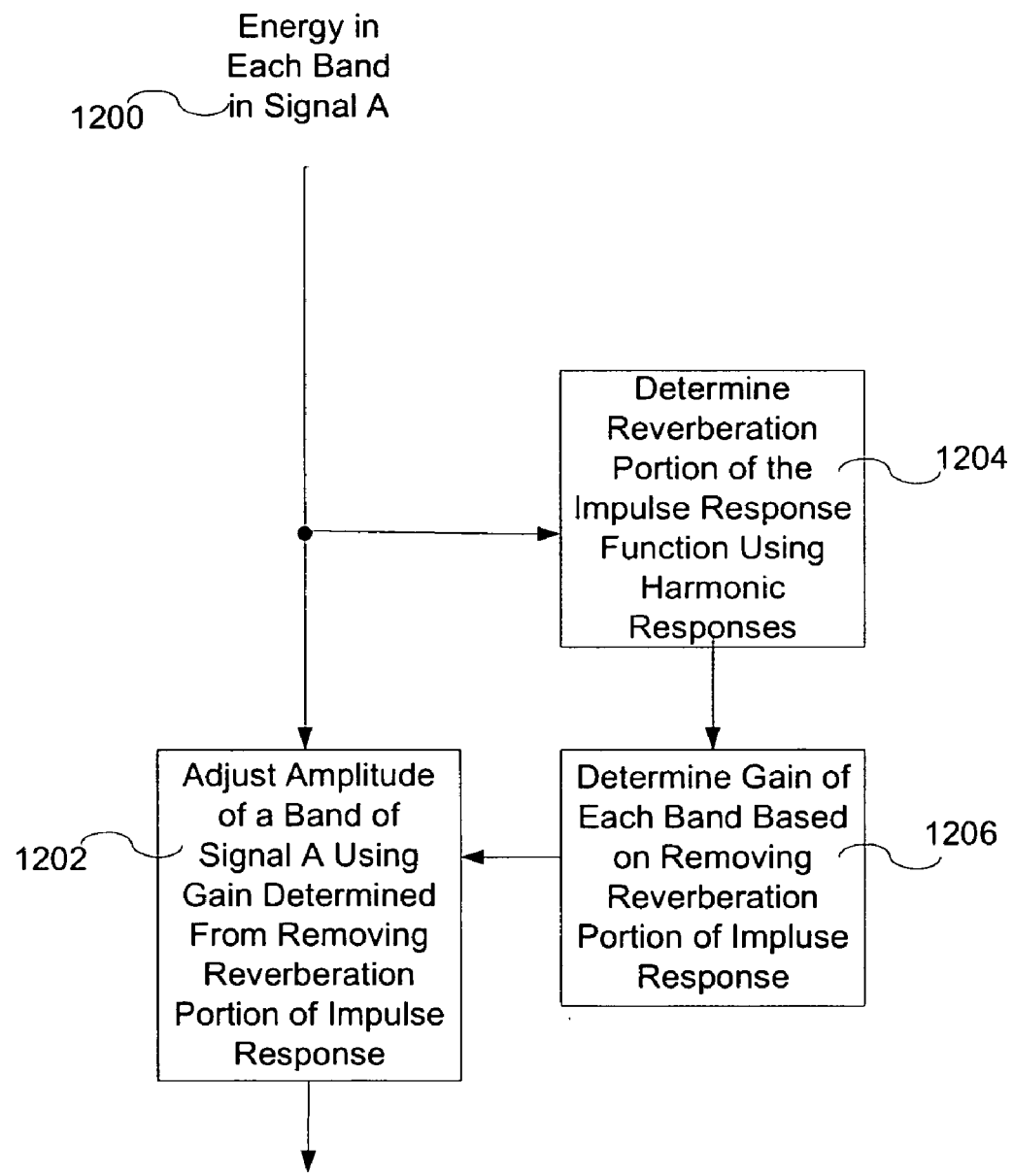
FIG. 12 illustrates reverberation removal using harmonic responses to derive the reverberant portion of the impulse response function.

FIG. 12 illustrates reverberation removal using voice pitch to derive the reverberant portion of the energy in each frequency band. In step 1204, harmonic information from signal A in each band 1200 is used to derive the reverberant portion of the impulse response. In some embodiments the reverberant portion of the impulse response function is derived by measuring the voice pitch as a function of harmonics that have little or no reverberation (e.g. higher frequency bands). By projecting this pitch value to the other harmonics (e.g. lower frequencies) and removing the other signals in those bands, the non-reverberant portion of the signal can be suppressed. In step 1206, a gain function is derived for signals in the different bands to suppress the reverberant portion of the signal energy. In step 1202, the signal energy is adjusted in each band according to the derived gain function.

Figure 13:
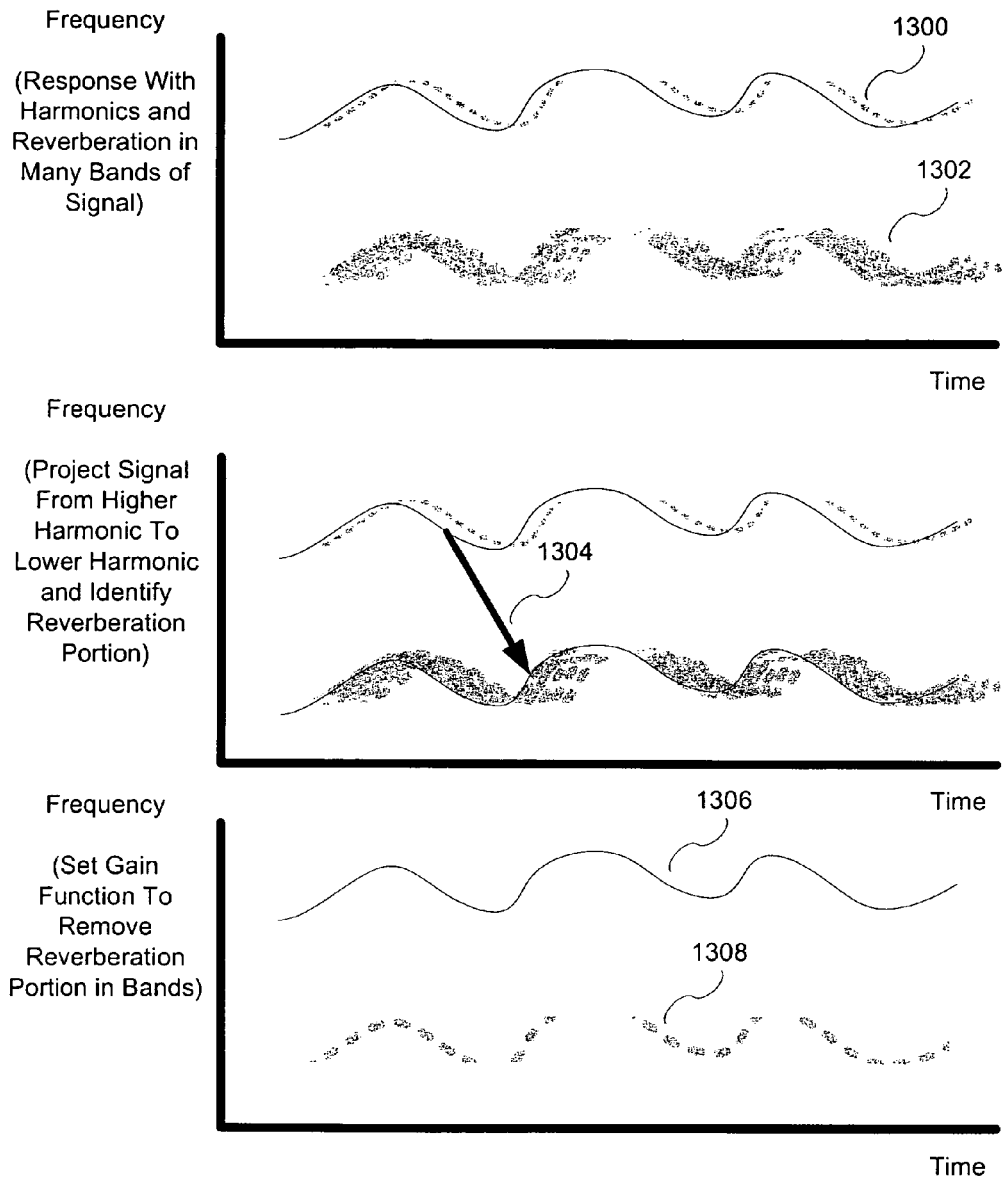
FIG. 13 illustrates reverberation removal derived from harmonic signal information.

FIG. 13 illustrates reverberation removal derived from harmonic signal information. Traces 1300 illustrate a high harmonic of a signal and its corresponding reverberation where the solid line represents the signal and the dashed line the reverberation. Since the signals are easily distinguished the voice pitch can easily be found. Trace 1302 illustrates the lower harmonic signal where the reverberant and non-reverberant portions of the signal are not easily distinguished from each other. The voice pitch derived from the higher harmonics can be projected to a lower harmonic so that the reverberant part of the signal can be rejected. Trace 1304 illustrates the pitch values derived from higher harmonics projected down to the lower harmonic. Trace 1306 and 1308 illustrate the higher harmonic and the lower harmonic with the reverberation portion of the signal removed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of removing reverberation from an audio signal comprising:
   spectro-temporally analyzing the audio signal to derive an energy function of time for a plurality of frequency bands,
   filtering for each frequency band the energy function of time with a first low pass filter,
   filtering for each frequency band the energy function of time with a second low pass filter where the second low pass filter has a longer time constant than the first low pass filter,
   subtracting for each frequency band the output of the second low pass filter from the output of the first low pass filter,
   resynthesizing an audio signal from the output signal of the subtraction in each frequency band, and
   mixing the resynthesized audio signal with the original signal.

2. A method of removing reverberation from a signal as in claim 1 wherein the audio signal is digital.

3. A method of removing reverberation from a signal as in claim 1 wherein the audio signal is analog.

4. A method of removing reverberation from a signal as in claim 1 wherein spectro-temporally analyzing the audio signal uses a Fourier Transform.

5. A method of removing reverberation from a signal as in claim 1 wherein spectro-temporally analyzing the audio signal uses a Fast Fourier Transform.

6. A method of removing reverberation from a signal as in claim 1 wherein spectro-temporally analyzing the audio signal uses Gammatone filter banks.

7. A method of removing reverberation from a signal as in claim 1 wherein spectro-temporally analyzing the audio signal uses a wavelet Transform.

8. A method of removing reverberation from a signal as in claim 1 wherein spectro-temporally analyzing the audio signal uses a cochlear model.

9. A method of removing reverberation from an audio signal comprising:
   spectro-temporally analyzing the audio signal to derive an energy function of time for a plurality of frequency bands,
   filtering for each frequency band the energy function of time with a first low pass filter,
   filtering for each frequency band the energy function of time with a second low pass filter where the second low pass filter has a longer time constant than the first low pass filter,
   subtracting for each frequency band the output of the second low pass filter from the output of the first low pass filter, mixing the output signal of the subtraction with the original energy function of time for each frequency band, and resynthesizing an audio signal from the energy in each frequency band.

10. A method of removing reverberation from a signal as in claim 9 wherein the audio signal is digital.

11. A method of removing reverberation from a signal as in claim 9 wherein the audio signal is analog.

12. A method of removing reverberation from a signal as in claim 9 wherein spectro-temporally analyzing the audio signal uses a Fourier Transform.

13. A method of removing reverberation from a signal as in claim 9 wherein spectro-temporally analyzing the audio signal uses a Fast Fourier Transform.

14. A method of removing reverberation from a signal as in claim 9 wherein spectro-temporally analyzing the audio signal uses Gammatone filter banks.

15. A method of removing reverberation from a signal as in claim 9 wherein spectro-temporally analyzing the audio signal uses a wavelet Transform.

16. A method of removing reverberation from a signal as in claim 9 wherein spectro-temporally analyzing the audio signal uses a cochlear model.

\* \* \* \* \*